(12) United States Patent
Han et al.

(10) Patent No.: US 12,579,080 B2
(45) Date of Patent: Mar. 17, 2026

(54) OUTPUT METHOD AND DEVICE

(71) Applicant: Lenovo (Beijing) Limited, Beijing (CN)

(72) Inventors: Shuang Han, Beijing (CN); Hsiang-I Chen, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 147 days.

(21) Appl. No.: 18/457,842

(22) Filed: Aug. 29, 2023

(65) Prior Publication Data

US 2024/0078193 A1     Mar. 7, 2024

(30) Foreign Application Priority Data

Sep. 1, 2022     (CN) .......................... 202211064604.3

(51) Int. Cl.
| | |
|---|---|
| *G06F 13/10* | (2006.01) |
| *G06F 3/14* | (2006.01) |
| *G06F 13/42* | (2006.01) |
| *G06F 3/0482* | (2013.01) |
| *G06F 3/0484* | (2022.01) |

(52) U.S. Cl.
CPC .............. *G06F 13/102* (2013.01); *G06F 3/14* (2013.01); *G06F 13/4282* (2013.01); *G06F 3/0482* (2013.01); *G06F 3/0484* (2013.01); *G06F 2213/0042* (2013.01)

(58) Field of Classification Search
CPC ...... G06F 3/1454; G06F 3/14; G06F 13/4282; G06F 13/102; G06F 3/1423; G06F 2213/0042; G06F 3/0482; G06F 3/0484; G09G 2370/14; G09G 2370/20
USPC ............................................................ 710/33
See application file for complete search history.

(56) References Cited

U.S. PATENT DOCUMENTS

| | | | | |
|---|---|---|---|---|
| 2022/0030191 | A1* | 1/2022 | Chen ...................... | H04N 7/104 |
| 2022/0215097 | A1* | 7/2022 | Soffer .................... | G09G 5/006 |
| 2022/0244794 | A1* | 8/2022 | Kaplanis ............. | G06F 13/4282 |
| 2023/0350501 | A1* | 11/2023 | Yong ................... | G06F 3/03543 |
| 2023/0400939 | A1* | 12/2023 | Reynolds ............... | G06F 3/038 |

* cited by examiner

*Primary Examiner* — Chun Kuan Lee
(74) *Attorney, Agent, or Firm* — ANOVA LAW GROUP, PLLC

(57) ABSTRACT

An output device includes an interaction interface configured to be connected to an interaction device, a first interface group configured to be connected to a first processing device, a second interface group configured to be connected to a second processing device, an output apparatus, and a processing apparatus configured to switch the output device between a first mode and a second mode. In the first mode, the output apparatus outputs media data from the first processing device, and interaction data is transmitted between the first processing device and the interaction device. In the second mode, the output apparatus outputs media data from the second processing device, and the interaction data is transmitted between the second processing device and the interaction device.

10 Claims, 14 Drawing Sheets

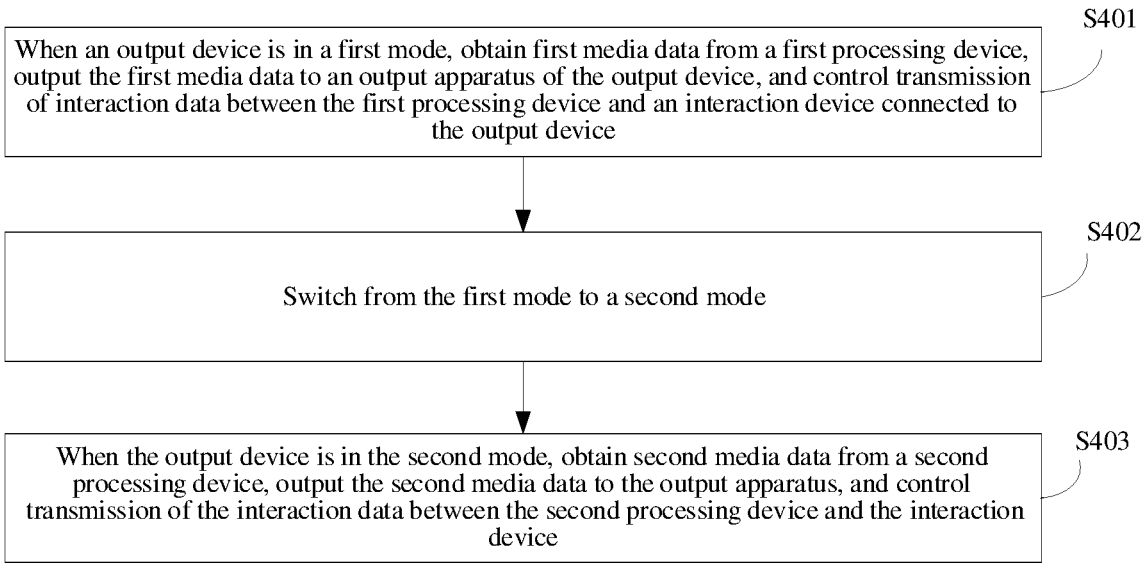

When an output device is in a first mode, obtain first media data from a first processing device, output the first media data to an output apparatus of the output device, and control transmission of interaction data between the first processing device and an interaction device connected to the output device

S401

Switch from the first mode to a second mode

S402

When the output device is in the second mode, obtain second media data from a second processing device, output the second media data to the output apparatus, and control transmission of the interaction data between the second processing device and the interaction device

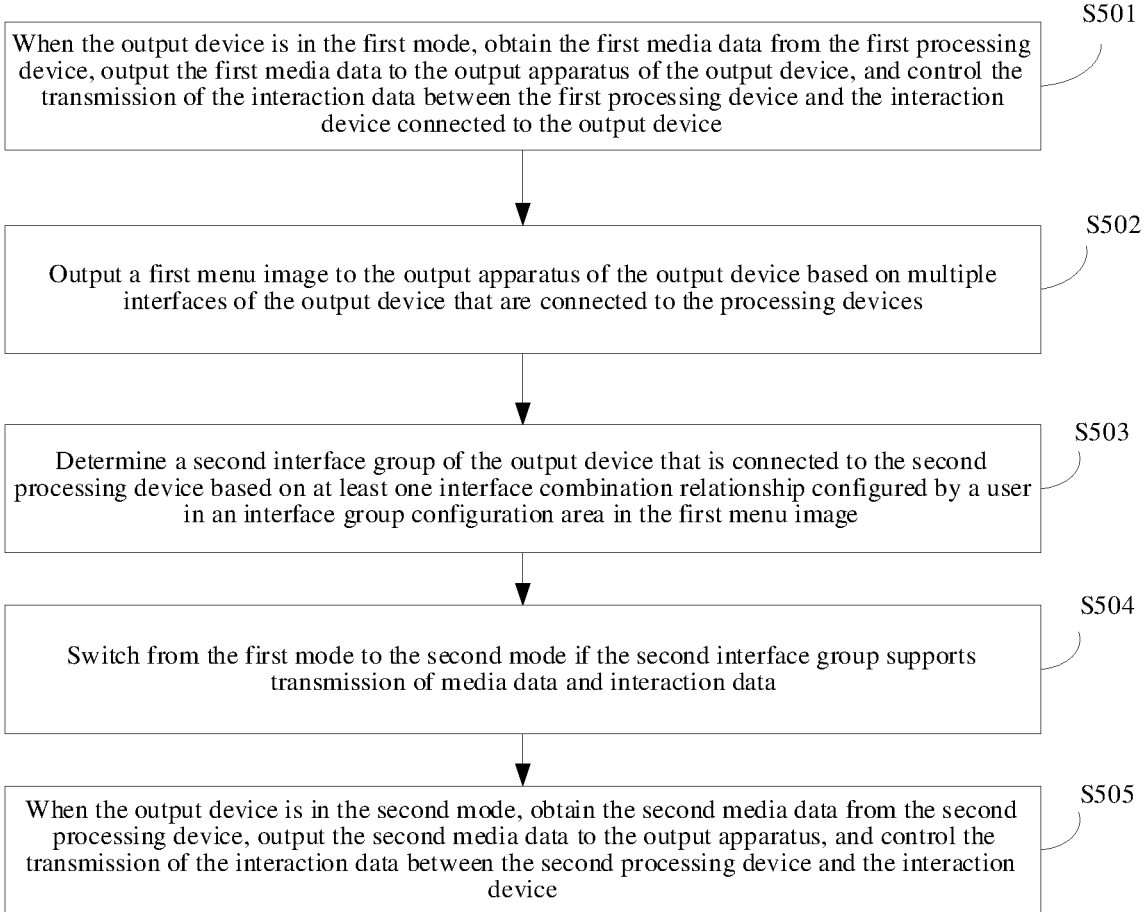

S501

When the output device is in the first mode, obtain the first media data from the first processing device, output the first media data to the output apparatus of the output device, and control the transmission of the interaction data between the first processing device and the interaction device connected to the output device

S502

Output a first menu image to the output apparatus of the output device based on multiple interfaces of the output device that are connected to the processing devices

S503

Determine a second interface group of the output device that is connected to the second processing device based on at least one interface combination relationship configured by a user in an interface group configuration area in the first menu image

S504

Switch from the first mode to the second mode if the second interface group supports transmission of media data and interaction data

S505

When the output device is in the second mode, obtain the second media data from the second processing device, output the second media data to the output apparatus, and control the transmission of the interaction data between the second processing device and the interaction device

FIG. 5

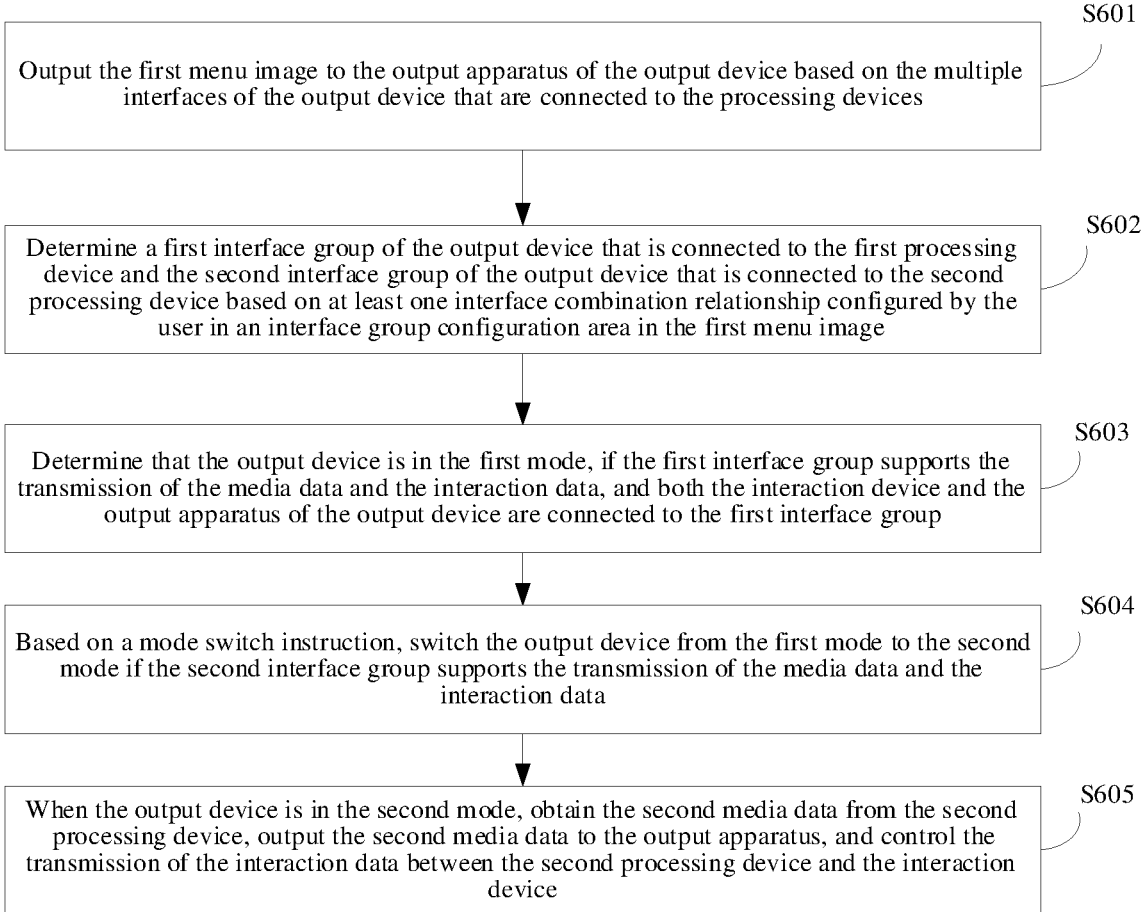

S601

Output the first menu image to the output apparatus of the output device based on the multiple interfaces of the output device that are connected to the processing devices

S602

Determine a first interface group of the output device that is connected to the first processing device and the second interface group of the output device that is connected to the second processing device based on at least one interface combination relationship configured by the user in an interface group configuration area in the first menu image

S603

Determine that the output device is in the first mode, if the first interface group supports the transmission of the media data and the interaction data, and both the interaction device and the output apparatus of the output device are connected to the first interface group

S604

Based on a mode switch instruction, switch the output device from the first mode to the second mode if the second interface group supports the transmission of the media data and the interaction data

S605

When the output device is in the second mode, obtain the second media data from the second processing device, output the second media data to the output apparatus, and control the transmission of the interaction data between the second processing device and the interaction device

FIG. 6

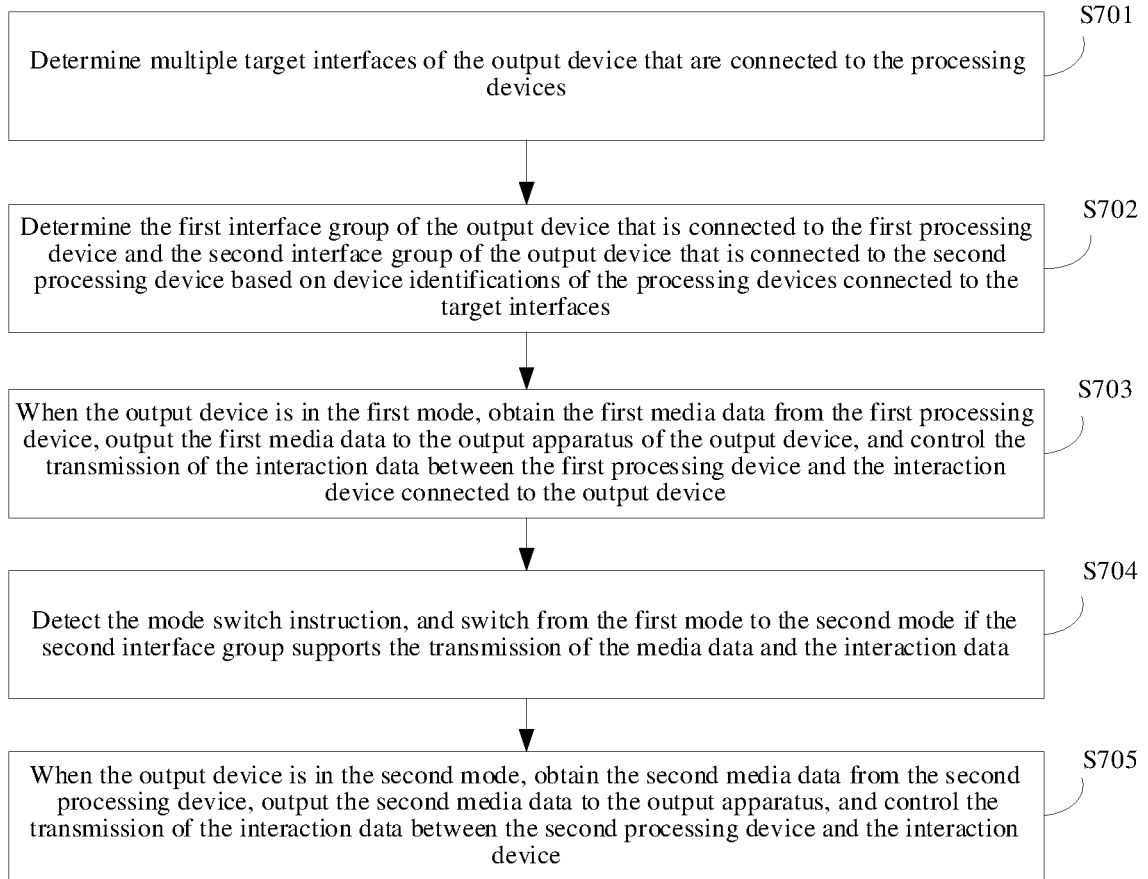

S701

Determine multiple target interfaces of the output device that are connected to the processing devices

S702

Determine the first interface group of the output device that is connected to the first processing device and the second interface group of the output device that is connected to the second processing device based on device identifications of the processing devices connected to the target interfaces

S703

When the output device is in the first mode, obtain the first media data from the first processing device, output the first media data to the output apparatus of the output device, and control the transmission of the interaction data between the first processing device and the interaction device connected to the output device

S704

Detect the mode switch instruction, and switch from the first mode to the second mode if the second interface group supports the transmission of the media data and the interaction data

S705

When the output device is in the second mode, obtain the second media data from the second processing device, output the second media data to the output apparatus, and control the transmission of the interaction data between the second processing device and the interaction device

FIG. 7

OUTPUT METHOD AND DEVICE

CROSS-REFERENCE TO RELATED APPLICATION

This application claim priority to Chinese Patent Application No. 202211064604.3, filed on Sep. 1, 2022, the entire content of which is incorporated herein by reference.

TECHNICAL FIELD

The present disclosure relates to the technical field of control and, more particularly, to an output method and device.

BACKGROUND

Output devices such as monitors are more and more widely used. Currently, an output device not only includes a video interface supporting video data transmission, but also includes a USB interface supporting interaction with a USB device. With the continuous development of technology, an output device usually includes multiple video interfaces and USB interfaces. Therefore, the output device may be connected to multiple other electronic devices at the same time. In this case, if it is needed to switch devices that provide video or USB-related data, there will be a problem of high complexity in device switch.

SUMMARY

In accordance with the disclosure, there is provided an output device including an interaction interface configured to be connected to an interaction device, a first interface group configured to be connected to a first processing device, a second interface group configured to be connected to a second processing device, an output apparatus, and a processing apparatus configured to switch the output device between a first mode and a second mode. In the first mode, the output apparatus outputs media data from the first processing device, and interaction data is transmitted between the first processing device and the interaction device. In the second mode, the output apparatus outputs media data from the second processing device, and the interaction data is transmitted between the second processing device and the interaction device.

Also in accordance with the disclosure, there is provided an output method including, while an output device is in a first mode, obtaining first media data from a first processing device, outputting the first media data to an output apparatus of the output device, and controlling transmission of interaction data between the first processing device and an interaction device connected to the output device, switching the output device from the first mode to a second mode, and while the output device is in the second mode, obtaining second media data from a second processing device, outputting the second media data to the output apparatus, and controlling transmission of the interaction data between the second processing device and the interaction device.

BRIEF DESCRIPTION OF THE DRAWINGS

In order to explain the embodiments of the present disclosure more clearly, reference is made to the accompanying drawings, which are used in the description of the embodiments. Obviously, the drawings in the following description are only some embodiments of the present disclosure, and other drawings can be obtained from these drawings without any inventive effort for those of ordinary skill in the art.

FIG. 4 shows a schematic flowchart of an output method according to an embodiment of the present disclosure.

FIG. 5 shows another schematic flowchart of an output method according to an embodiment of the present disclosure.

FIG. 6 shows another schematic flowchart of an output method according to an embodiment of the present disclosure.

FIG. 7 shows another schematic flowchart of an output method according to an embodiment of the present disclosure.

DETAILED DESCRIPTION OF THE EMBODIMENTS

The technical solutions in the embodiments of the present disclosure will be described in detail with reference to the accompanying drawings. Obviously, the described embodiments are only some of rather than all the embodiments of the present disclosure. Based on the described embodiments, all other embodiments obtained by those of ordinary skill in the art without inventive effort shall fall within the scope of the present disclosure.

Figure 1:
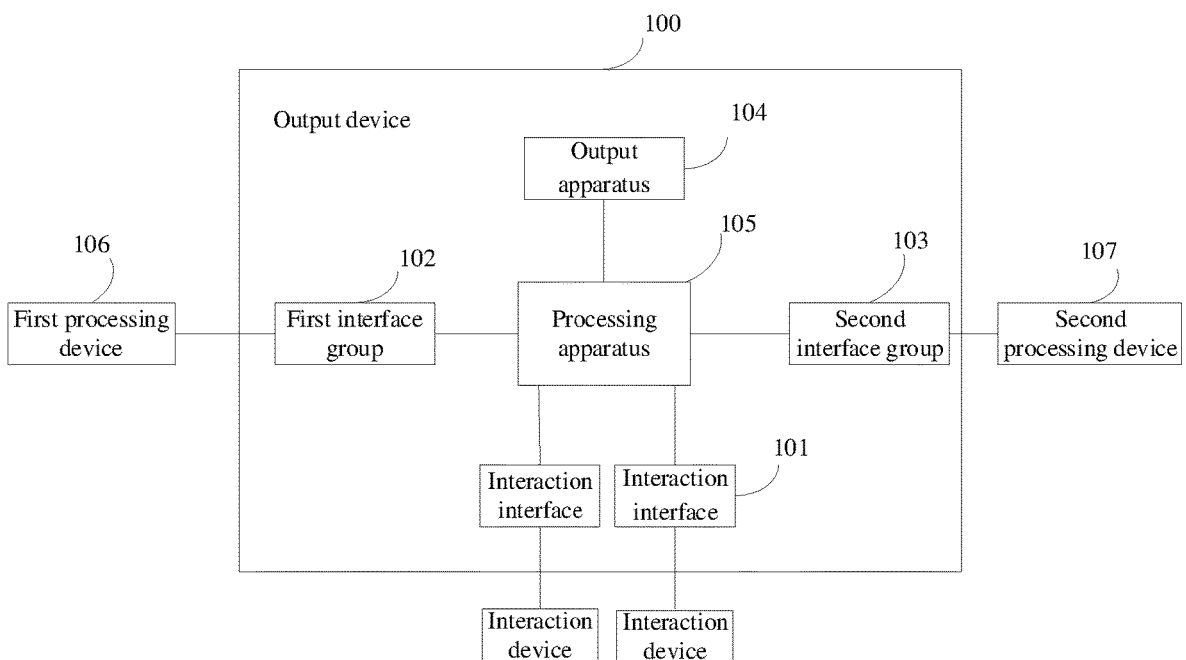
FIG. 1 shows a schematic structural diagram of an output device according to an embodiment of the present disclosure.

FIG. 1 is a schematic structural diagram of an output device according to an embodiment of the present disclosure.

An output device 100 includes at least one interaction interface 101, a first interface group 102, a second interface group 103, an output apparatus 104, and a processing apparatus 105.

The interaction interface 101 is configured to be connected to an interaction device.

The interaction device refers to a device that can perform data interaction between the output device and a processing device connected to the output device. Interaction data between the interaction device and the processing device may be input instructions, input content, some data, etc. For example, the interaction device may be an input device, such as a keyboard, a mouse, or another input device. As another example, the interaction device may also be a data storage device, such as a portable hard disk, a universal serial bus (USB) flash disk which is commonly known as a flash drive, etc.

An interaction interface is an interface provided at the output device that can be configured to be connected to the above various interaction devices. For example, the interaction interface may be a USB interface, another type of interface compatible with the USB interface, etc.

The first interface group 102 is configured to be connected to a first processing device. The second interface group 103 is configured to be connected to a second processing device. As shown in FIG. 1, the first interface group 102 is connected to a first processing device 106, and the second interface group 103 is connected to a second processing device 107.

In the present disclosure, for ease of distinction, two processing devices connected to the output device are respectively referred to as the first processing device and the second processing device. The processing device may be a host computer, or an electronic device such as a notebook computer, a desktop computer, a mobile phone, etc.

The first processing device and the second processing device may establish a connection with the output device through at least one interface at the output device. In the present disclosure, an interface group of the output device that is configured to be connected to the first processing device is referred to as a first interface group, and an interface group of the output device that is connected to the second processing device is referred to as a second interface group.

Both the first interface group and the second interface group may include at least one interface.

The output apparatus 104 is configured to output media data.

For example, an output apparatus may be a display screen, and the output device may be an electronic device including the display screen, such as a smart TV, a smart display screen, a desktop computer, etc. In this case, the media data may include image data.

As another example, the output apparatus may be an audio output device, such as a speaker, and the media data may include audio data.

In some embodiments, the output apparatus may include an image output device (such as the display screen) and the audio output device. In this case, the media data includes at least the image data to be displayed (such as videos, pictures, documents, etc.), and may also include the audio data.

The processing apparatus 105 is configured to switch the output device from a first mode to a second mode.

When the output device is in the first mode, the output apparatus can output the media data from the first processing device, and the interaction data can be transmitted between the first processing device and the interaction device.

When the output device is in the second mode, the output apparatus can output the media data from the second processing device, and the interaction data can be transmitted between the second processing device and the interaction device.

In the embodiments of the present disclosure, when the output device is connected to the first processing device and the second processing device at the same time, the output device has the first mode and the second mode. In the first mode, the output device can output the media data from the first processing device through the output apparatus, and control a transmission of the interaction data between the first processing device and the interaction device connected to the output device; while in the second mode, the output device can output the media data from the second processing device through the output apparatus, and control a transmission of the interaction data between the second processing device and the interaction device connected to the output device. Therefore, the output device can be switched between the first mode and the second mode, so that media data source of the output device and the processing device connected to a connected interaction device can be switched synchronously, and the processing devices connected to different types of interfaces of the output device can be switched more efficiently, which reduces complexity of device switch.

In the first mode, the first processing device not only can output the media data to the output apparatus of the output device through the first interface group, but also can transmit the interaction data with the interaction device connected to the output device. Therefore, the first interface group supports transmission of the media data and the interaction data.

Similarly, in the second mode, the second processing device not only can output the media data to the output apparatus through the second interface group, but also can transmit the interaction data with the interaction device. Therefore, if the output device can be switched to the second mode, it indicates that the second interface group supports the transmission of the media data and the interaction data.

The output device may include multiple types of different interfaces. For example, the output device may include at least one integrated interface, such as at least one of a USB-C (also referred to as a USB Type-C) interface or a thunderbolt interface. The output device may also include at least one interface that supports that image data (also referred to as a video interface), such as at least one of a high definition multimedia interface (HDMI) or a display port (DP) interface. In addition, the output device may also include at least one interface that supports the interaction data, such as the USB interface.

The DP interface is a digital video interface standard standardized by video electronics standards association (VESA). The thunderbolt interface is an integrated transmission interface that supports fast transmission of data, audio, and video streams.

Based on the various interface types of the output device, there may be many possibilities of the interfaces that the first interface group and the second interface group may include.

For example, in a possible situation, the first interface group may include a first data interface that supports interaction data transmission and a first media interface that supports media data transmission. In this case, the first interface group includes two interfaces, which are a data interface and a media interface. For example, the first data interface may be the USB interface, and the first media interface may be the HDMI interface, the DP interface, etc.

In another possible situation, the first interface group may be a first integrated interface that supports the transmission of the interaction data and the media data. In this case, the first interface group is actually an integrated interface that supports the transmission of the interaction data and the media data, such as the first integrated interface compatible with the USB interface and the media interface. For example, the first interface group may be the USB-C interface or the thunderbolt interface.

Similar to the first interface group, in a scenario that it can be switched from the first mode to the second mode, the second interface group may include a second data interface that supports the interaction data transmission and a second media interface that supports the media data transmission, or a second integrated interface that supports the transmission of the interaction data and the media data. For example, the second interface group may include a USB interface that supports USB data transmission, and an HDMI or DP interface that supports the media data transmission.

When the first interface group and the second interface group are respectively in the above possible situations, there may also be multiple combinations of the first interface group and the second interface group. For example, the first interface group includes the first data interface and the first media interface, and the second interface group includes the second data interface and the second media interface. As another example, the first interface group is the USB-C interface or the thunderbolt interface, and the second interface group is also the USB-C interface or the thunderbolt interface, which are not limited herein.

When the first interface group and the second interface group are in the above possible situations, if the output device is in the first mode, the processing apparatus of the output device can be configured to control the first media interface or the first integrated interface in the first interface group to be connected to the output apparatus, and control the first data interface or the first integrated interface in the first interface group to be connected to at least one of the interaction interfaces.

Correspondingly, if the output device is in the second mode, the processing apparatus is configured to control the second media interface or the second integrated interface in the second interface group to be connected to the output apparatus, and control the second data interface or the second integrated interface in the second interface group to be connected to at least one of the interaction interfaces.

Two possible manners of the first interface group and the second interface group are described below for ease of understanding of specific situations of two modes of the output device.

Figure 2:
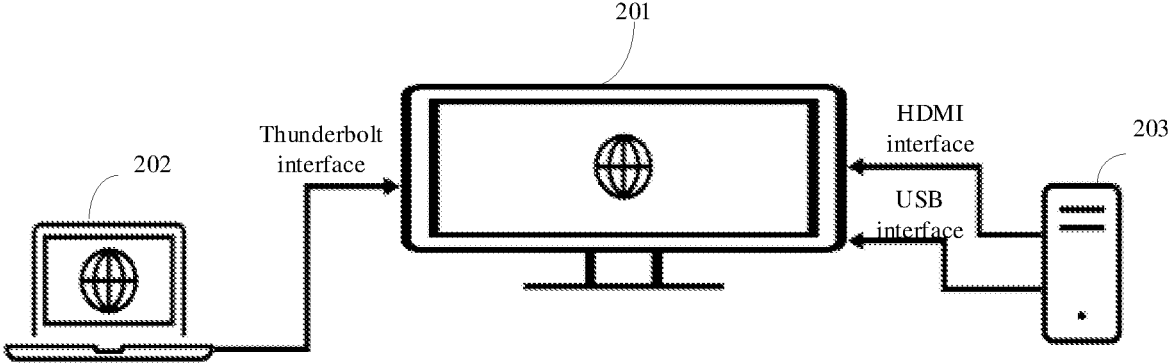
FIG. 2 shows a schematic structural diagram of an output device connected to two processing devices according to an embodiment of the present disclosure.

FIG. 2 shows a schematic structural diagram of the output device connected to two processing devices.

In FIG. 2, an output device 201 may be an electronic device including a display unit (display screen). For example, the output device may be a display or a smart TV. Correspondingly, the output apparatus of the output device may be a display screen, and may also include a speaker, etc.

The output device 201 is connected to a first processing device 202 through the thunderbolt interface (TBT interface). In FIG. 2, an example in which the first processing device 202 is a laptop computer is used for illustration.

Meanwhile, the output device 201 is connected to a second processing device 203 through a USB interface and a HDMI interface. As shown in FIG. 2, an example in which the second processing device is a host device is used for illustration.

At least one interaction interface at the output device may also be connected to at least one interaction device. For example, in a possible implementation manner, each interaction interface of the output device may be integrated on a hub. The hub is also referred to as a multi-port repeater. The hub may provide multiple USB interfaces connected to a keyboard or a mouse.

In the configuration shown in FIG. 2, in the first mode, the processing apparatus of the output device can control the thunderbolt interface to be connected to the output apparatus such as a display device and the speaker of the output device, so that the output device can output the audio and video data from the first processing device 202 connected to the thunderbolt interface.

Meanwhile, in the first mode, the processing apparatus of the output device controls the thunderbolt interface connected to the first processing device 202 to be connected to the interaction devices such as the keyboard, the mouse, etc. For example, the thunderbolt interface is controlled to be connected to the hub, so that the keyboard and the mouse can output input information such as control instructions to the first processing device.

After the output device is switched from the first mode to the second mode, the processing apparatus of the output device controls the output device to be connected to the HDMI interface connected to the second processing device 203, so that the display screen of the output device can display the image data from the second processing device, and cause the speaker of the output device to play the audio data from the second processing device. Moreover, the processing apparatus also controls connection between the interaction devices, such as the mouse and the keyboard, and the USB interface connected to the second processing device, so that the mouse and the keyboard can interact with the second processing device to input information and other interaction data.

FIG. 2 shows an example in which the interaction device are the mouse and the keyboard. If the interaction device is the flash drive or the portable hard disk, an interaction between the processing device and the interaction device can be the transmission of the interaction data. For example, the processing device stores data in the flash drive or the portable hard disk, or transmits data stored in the flash drive or the portable hard disk to the processing device.

In existing technologies, if it is wanted to switch video source of the output device, and to switch USB devices (the processing device for USB data interaction with the output device) connected to the keyboard and the mouse, two switch operations are needed. One switch operation is switching the video source of the output device, such as switching the video source of the output device from the thunderbolt interface to the HDMI interface. Another switch operation is switching connection between the thunderbolt interface and the keyboard and the mouse to connection between the USB interface connected to the second processing device and the keyboard and the mouse, such as switching connection between the thunderbolt interface and the hub to connection between the USB interface connected to the second processing device and the hub. As such, two operations are needed to switch between video and USB devices each time, and operation complexity is relatively high.

In the present disclosure, the output device is switched from the first mode to the second mode, so that not only the video source of the output apparatus of the output device can be switched from the first processing device from the thunderbolt interface to the second processing device from the HDMI interface, but also the connection between the thunderbolt interface and the keyboard and the mouse can be switched from the connection between the USB interface connected to the second processing device and the keyboard and the mouse. Therefore, one mode switch can realize switch of the video sources and the USB devices connected to the input device synchronously.

Figure 3:
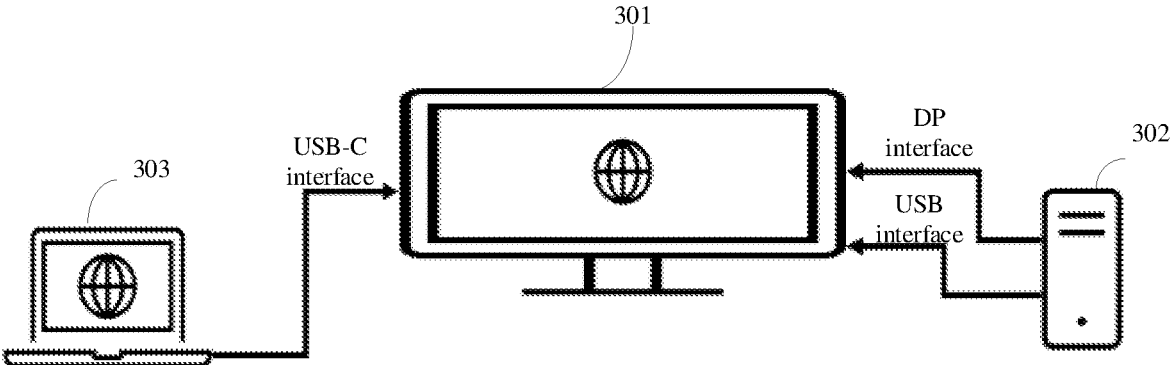
FIG. 3 shows another schematic structural diagram of an output device connected to two processing devices according to an embodiment of the present disclosure.

FIG. 2 only shows a case where the output device is connected to the first processing device and the second processing device through the first interface group and the second interface group, respectively. FIG. 3 shows another schematic structural diagram of the output device connected to two processing devices.

In FIG. 3, a USB interface and a display interface (DP interface) of an output device 301 are simultaneously connected to a first processing device 302, and the USB-C interface of the output device is connected to a second processing device 303. In FIG. 3, an example in which the first processing device is the host device, and the second processing device is the notebook computer is used for illustration.

The output device may also be connected to at least one interaction device through at least one interaction interface thereof (not shown in FIG. 3).

In the configuration shown in FIG. 3, when the output device is in the first mode, the processing apparatus of the output device can control the DP interface to be connected to the output apparatus, so that multimedia data such as video and audio of the first processing device connected to the DP interface can be output through the display screen or the speaker of the output device. Also, the processing apparatus controls the USB interface connected to the first processing device 302 to be connected to the interaction interface connected to the interaction device, so that the multimedia data such as video output by the output device comes from the first processing device, and the first processing device can transmit interaction data with the interaction device.

Similarly, when the output device is in the second mode, the processing apparatus of the output device controls the output apparatus and the interaction device to be connected to the USB-C interface, so that multimedia source of the output device is switched to be from the second processing device, and it is switched from that the first processing device can interact with the interaction device to that the second processing device can interact with the interaction device.

FIGS. 2 and 3 only show an implementation manner in which the output device is connected to the first processing device through the first interface group, and is connected to the second processing device through the second interface group. In practical applications, there may be other possible forms of the first interface group and the second interface group, which will not be repeated herein.

Based on the above content, an output method consistent with the present disclosure will be described below in combination with a flowchart.

FIG. 4 shows a schematic flowchart of an output method consistent with the present disclosure. The method can be applied to the output device described above.

The method includes the following processes.

S401, when the output device is in the first mode, obtaining first media data from the first processing device, outputting the first media data to the output apparatus of the output device, and controlling the transmission of the interaction data between the first processing device and the interaction device connected to the output device.

The output device includes the first interface group, the interaction interface, and the output apparatus.

The first interface group of the output device is connected to the first processing device, and the output device is connected to at least one interaction device through at least one interaction interface.

As for structure of the output device and connection relationship between the output device and the first processing device, reference may be made to the relevant description above, which will not be repeated herein.

For ease of distinction, in the present disclosure, the media data from the first processing device is referred to as the first media data, and the subsequent media data from the second processing device is referred to as second media data.

As mentioned above, there may be multiple types of interaction devices, and correspondingly, there may be multiple possibilities of the interaction data transmitted between the first processing device and the interaction device. For example, when the interaction device is the input device such as the keyboard or the mouse, the interaction data between the first processing device and the interaction device may be input data input by the input device. As another example, when the interaction device is the storage device such as the flash drive, the interaction data transmitted between the first processing device and the interaction device may be data obtained from the storage device or data written into the storage device.

S402, switching from the first mode to the second mode.

For example, a mode switch instruction is detected, and the first mode is switched to the second mode. The mode switch instruction is configured to instruct to switch the media data source of the output apparatus and the processing device connected to the interaction device.

The mode switch instruction can be triggered in various manners.

For example, in a possible implementation manner, a physical button for triggering synchronous switch of the media data and the interaction data can be arranged at the output device, and the physical button can be referred to as a synchronous switch button. When it is detected that the synchronous switch button is triggered, it is determined that the mode switch instruction is detected.

In another possible implementation manner, a switch option may be displayed in a setup menu image, and the setup menu image may affect display of the media data obtained by the output device from the first processing device or the second processing device. The setup menu image is generated by the processing apparatus of the output device instead of image information from the first processing device or the second processing device. The setup menu image may be the same as a subsequent first menu image, or may be a different menu image.

For example, the setup menu image may be an on-screen display (OSD) menu, in which there is a switch option for triggering synchronous switch of the media data and the processing devices connected to the interaction interfaces. Correspondingly, by opening the OSD menu and selecting the switch option, a user can trigger the output device to generate the mode switch instruction.

S403, when the output device is in the second mode, obtaining the second media data from the second processing device, outputting the second media data to the output apparatus, and controlling the transmission of the interaction data between the second processing device and the interaction device.

The output device may include the second interface group, and the second processing device may be connected to the output device through the second interface group. As for a connection structure between the output device and the second processing device, reference may be made to the relevant description in the above embodiments, which will not be repeated herein.

In the second mode, the output device controls the output apparatus to be connected to the second interface group, and controls the interaction interface connected to the interaction device to be connected to the second interface group, so as to switch the media data source and a connection with the interaction device to the second processing device.

In the embodiments of FIG. 4, the output device can be switched between the first mode and the second mode, so that the media data source of the output device and the processing device connected to the connected interaction device can be switched synchronously, and the processing devices connected to different types of interfaces of the output device can be switched more efficiently, which reduces the complexity of device switch.

Normally, if the user triggers switch from the first mode to the second mode, the second interface group supports the transmission of the media data and the interaction data by default.

However, in some special cases, the second interface group may only support one kind of the transmission of the media data and the interaction data, so it is impossible to switch the processing device connected to the interface device while the media source is switched, that is, it is impossible to switch from the first mode to the second mode.

Therefore, in order to reduce misjudgments, before it is switched from the first mode to the second mode, it is also needed to determine the second interface group of the output device that is connected to the second processing device in the present disclosure. Correspondingly, if the second interface group supports the transmission of the media data and the interaction data, it is switched from the first mode to the second mode.

There are many possible implementation manners for determining the second interface group of the output device that is connected to the second processing device. For ease of understanding, an output method consistent with the present disclosure will be described below in combination with several possible situations of determining the second interface group.

FIG. 5 shows another schematic flowchart of an output method consistent with the present disclosure, which can be applied to the output device. The method includes the following processes.

S501, when the output device is in the first mode, obtaining the first media data from the first processing device, outputting the first media data to the output apparatus of the output device, and controlling the transmission of the interaction data between the first processing device and the interaction device connected to the output device.

The first processing device is connected to the output device through the first interface group of the output device.

For example, the first interface group is the first integrated interface supporting the transmission of the media data and the interaction data, such as the thunderbolt interface. In this case, if it is determined that the output device is connected to the output apparatus and the interaction device through the first integrated interface, it is determined that the output device is in the first mode.

When the output device is connected to two processing devices at the same time, in the present disclosure, a processing device that is connected to the output apparatus and the interaction device at any moment is referred to as the first processing device, and a mode that the output device is in at a current moment is referred to as the first mode. Correspondingly, after the mode is switched, a processing device connected to the output device and the interaction device is referred to as the second mode, and a mode to which the first mode is switched is referred to as the second mode.

S502, outputting the first menu image to the output apparatus of the output device based on the multiple interfaces of the output device that are connected to the processing devices.

In the case that the multiple interfaces of the output device are connected to the processing devices, the output device cannot determine whether the multiple interfaces are connected to the same processing device or which interfaces are connected to the same processing device. Therefore, it is needed to output the first menu image based on the interfaces connected to the processing devices at the output device, so that the user can operate on the first menu image and determine which interfaces are combined to be connected to one processing device.

The first menu image may affect display of the first media data, and may also affect display of the second media data output by the second processing device other than the first processing device.

The first menu image is generated by the processing apparatus of the output device instead of the image information from the first processing device or the second processing device. The first menu image has a higher display priority, which is higher than that of the image information from the first processing device and other processing devices connected to the output device, so that the first menu image can affect display of image information in the first media data and the media data output by other processing devices connected to the output device.

In an implementation manner, the first menu image may be displayed on top of display content output by the output apparatus, so that the first media data and other display content may be blocked or covered. A manner of blocking or covering can be presented by using a semi-transparent layer or a non-transparent layer, so that the displayed first menu image can affect the display or viewing effect of the first media data and the subsequent second media data output by the output apparatus.

For example, the first menu image may be the OSD menu.

S503, determining the second interface group of the output device that is connected to the second processing device based on at least one interface combination relationship configured by the user in an interface group configuration area in the first menu image.

In the present disclosure, the first menu image includes the interface group configuration area, which is configured to configure combination relationship between the multiple interfaces of the output device that are connected to the processing device.

There are many possibilities of the interface group configuration area. Correspondingly, manners for the user to configure at least one interface combination relationship in the interface group configuration area are also different.

For example, in a possible implementation manner, at least one candidate interface combination relationship that may be combined among multiple interfaces may be displayed in the interface group configuration area. Each candidate interface combination relationship includes at least one interface, and each candidate interface combination relationship represents a combination of at least one interface connected to the same processing device.

For example, referring to FIG. 2, the thunderbolt interface, one USB interface, and one HDMI interface of the output device are all connected to the processing devices. The thunderbolt interface can only be connected to one processing device as the integrated interface supporting the media data and the interaction data. However, the output device cannot determine whether the USB interface and the HDMI interface are connected to one processing device.

If the first processing device is connected to the thunderbolt interface, the interface group configuration area can display the candidate interface combination relationship of possible combinations of the USB interface and the HDMI interface. For example, the USB interface and the HDMI interface are one candidate interface combination relationship, the USB interface is another candidate interface combination relationship, and the HDMI interface is another candidate interface combination relationship.

In this implementation manner, the user may select one candidate combination relationship from at least one candidate combination relationship as the configured interface combination relationship according to the actual situation that the interfaces of the output device are actually connected to the processing devices. Correspondingly, the interfaces included in the interface combination relationship are also the second interface group to which the second processing device is connected.

In some other embodiments, the user may also select the interface combination relationship of the first processing device and the second processing device connected to the output device. On this basis, the output device can determine the second interface group connected to the second processing device by combining the interfaces connected to the output apparatus and the interaction device, and the interface combination relationship configured by the user.

In another possible implementation manner, the interface group configuration area may include information about the multiple interfaces connected to the processing devices at the output device, such as names of the multiple interfaces. On this basis, the user can obtain at least one interface group combination relationship according to a combination of at least one interface that needs to be configured and connected to the same processing device. After at least one interface group combination relationship is determined, a manner of determining the second interface group connected to the second processing device may be the same as described above, which will not be repeated herein.

Processes S502 and S503 may be performed after process S501 or before process S501. For example, before it is determined that the output device is in the first mode, the interface group corresponding to each processing device connected to the output device is first determined based on user configuration.

In addition, the above processes S502 and S503 may be performed when a synchronous mode switch instruction or other conditions requiring switch from the first mode to the second mode are detected. The two processes may also be performed before the synchronous mode switch instruction is detected or the conditions for performing mode switch are met. For example, the user triggers start of the first menu image for configuration, and at least determines the second interface group of the second processing device.

S504, switching from the first mode to the second mode if the second interface group supports the transmission of the media data and the interaction data.

S505, when the output device is in the second mode, obtaining the second media data from the second processing device, outputting the second media data to the output apparatus, and controlling the transmission of the interaction data between the second processing device and the interaction device.

In some embodiments, the output device outputs the first menu image to the output apparatus based on the multiple interfaces of the processing device connected to the output device, so that the user can configure the interface combination relationship of the processing device for connection of the output device in the interface group configuration area of the first menu image. Therefore, when the output device is in the first mode, it can be determined more accurately and conveniently whether the second interface group of the second processing device connected to the output device supports the transmission of the media data and the interaction data, which can also effectively ensure that channels of the media data and the interaction data are switched from one processing device to another processing device synchronously.

An example in FIG. 2 is used for illustration. As described above, in the configuration shown in FIG. 2, the output device can determine that the thunderbolt interface is connected to one processing device, and the processing device can realize the transmission of the media data and the interaction data based on the thunderbolt interface. However, the output device cannot determine whether the USB interface and the HDMI interface are connected to one processing device. In this case, if the user configures the USB interface and the HDMI interface as one interface combination relationship in the first menu image, it indicates that the USB interface and the HDMI interface are connected to the same processing device.

In this case, if the output device controls the thunderbolt interface to be connected to the output apparatus and the interaction device, the output device is in the first mode, and the first processing device can output the media data to the output apparatus and interact with the interaction device. On this basis, if the synchronous mode switch instruction is detected, since it can be determined that the second interface group of the second processing device supports the transmission of the media data and the interaction data, the output device can be controlled to switch from the first mode to the second mode.

On the basis of the embodiments of FIG. 5, if the first interface group connected to the first processing device at the output device includes two interfaces, the output device may also be unable to determine whether the two interfaces corresponding to the first interface group are connected to the same processing device. Therefore, the output device also needs to determine the interface groups connected to each processing device before determining the mode the output device is in. For this situation, description will be made below with reference to FIG. 6.

FIG. 6 shows another schematic flowchart of an output method consistent with the present disclosure. The method includes the following processes.

S601, outputting the first menu image to the output apparatus of the output device based on the multiple interfaces of the output device that are connected to the processing devices.

The first menu image includes the interface group configuration area.

For example, an interface configuration request input by the user is obtained, and the first menu image is output. When the user needs to configure an interface connection relationship between each processing device and the output device, the interface configuration request may be input, such as that the user can display the OSD menu including the interface group configuration area by opening the OSD menu.

As another example, if the output device cannot determine the interface groups of the connected processing devices when the mode switch instruction is detected, such as that the user has not configured the interface combination relationship before the mode switch instruction is detected, and the output device cannot determine the interface group to which the processing device is connected, the first menu image may be output first based on the multiple interfaces of the output device that are connected to the processing devices.

S602, determining the first interface group of the output device that is connected to the first processing device and the second interface group of the output device that is connected to the second processing device based on at least one interface combination relationship configured by the user in the interface group configuration area in the first menu image.

The interface combination relationship can represent a relationship between the interfaces of the output device combined to connect to the same device, and correspondingly, each interface combination relationship can represent an interface group. Therefore, at least one interface combination relationship can be combined to determine two interface groups configured by the output device to connect to two processing devices.

For ease of distinction, the two interface groups of the output device are referred to as the first interface group and the second interface group respectively. The processing device connected to the first interface group is referred to as the first processing device, and the processing device connected to the second interface group is referred to as the second processing device.

A method of determining the first interface group connected to the first processing device is similar to the aforementioned method of determining the second interface group connected to the second processing device.

For example, if the interface group connected to one of the first processing device and the second processing device is the integrated interface that supports the transmission of the media data and the interaction data at the same time, the user only needs to configure one interface combination relationship. On this basis, it can be determined that the interface group corresponding to the interface combination relationship is connected to one processing device, and the integrated interface is connected to another processing device. The two processing devices are respectively referred to as the first processing device and the second processing device.

As another example, if the first processing device and the second processing device are respectively connected to two interfaces (one media interface and one data interface for transmitting the interaction data), in order to determine that the two interfaces are connected to one processing device, the user needs to configure two interface combination relationships in the interface group configuration area of the first menu image. Therefore, the interface group represented by one interface combination relationship corresponds to one processing device, so that the interface groups connected to the two processing devices of the output device can be determined based on the two interface combination relationships configured by the user, that is, the first interface group connected to the first processing device and the second interface group connected to the second processing device can be determined.

As for the interface group configuration area in the first menu image and manners for the user to configure the interface combination relationship in the interface group configuration area, reference may be made to the relevant description in the above embodiments, which will not be repeated herein.

The above configuration of the interface combination relationship and the determination of the interface groups connected to the first processing device and the second processing device only need to be performed once. If the interface groups connected to the processing devices do not change, the above configuration does not need to be performed every time before mode switch.

S603, determining that the output device is in the first mode, if the first interface group supports the transmission of the media data and the interaction data, and both the interaction device and the output apparatus of the output device are connected to the first interface group.

Since the first interface group and the second interface group are only different interface groups for distinguishing the two devices connected to the output device, any one of the two interface groups that supports the transmission of the media data and the interaction data at the same time, and to which the output device currently controls the output apparatus and the interaction device to be connected can be referred to as the first interface group. Correspondingly, a state in which the first interface group is connected to the output apparatus and the interaction device is referred to as the first mode.

When the output device is in the first mode, the first media data from the first processing device is obtained, the first media data is output to the output apparatus of the output device, and the interaction data between the first processing device and the interaction device connected to the output device is controlled to transmit.

Determining that the device is in the first mode may be performed after the two interface groups connected to the output device are determined. It may also be determined whether the output device is in the first mode when the mode switch instruction is detected, and subsequent operations are performed after it is determined that the output device is in the first mode.

S604, based on the mode switch instruction, switching the output device from the first mode to the second mode if the second interface group supports the transmission of the media data and the interaction data.

The mode switch instruction may be received before process S601 is performed, before process S603 is performed, or before process S604 is performed, and switching from the first mode to the second mode is performed based on the mode switch instruction.

S605, when the output device is in the second mode, obtaining the second media data from the second processing device, outputting the second media data to the output apparatus, and controlling the transmission of the interaction data between the second processing device and the interaction device.

Based on the description of the embodiments of FIG. 6, before the mode switch instruction is detected, the user can configure the interface groups connected to the two processing devices at the output device in the interface group configuration area of the first menu image. On this basis, if the output device is in the first mode corresponding to the first interface group, and the second interface group also supports the transmission of the media data and the interaction data at the same time, the user can input the mode switch instruction (such as by clicking the synchronous switch button), so that the media data and the interaction device can be synchronously switched to the second processing device connected to the second interface group, and the media data and the processing device connected to the interaction device can be synchronously switched through one operation.

In some other embodiments, after the mode switch instruction is detected, if the output device cannot determine the respective interface groups of the two processing devices, the user only needs to configure the interface combination relationship to complete switching from the first mode to the second mode. The user does not need to repeatedly configure the interface combination relationship for subsequent switches between the first mode and the second mode, and can conveniently realize switching of the processing devices connected to the media data and the interaction device through one mode switch instruction.

In another possible implementation manner, after the output device is connected to the processing device, multiple target interfaces connected to the processing devices can be determined. On this basis, the output device can obtain device identifications of the processing devices connected to the target interfaces through the target interfaces. On this basis, combined with the device identifications of the processing devices connected to different target interfaces, the corresponding interface groups of the two processing devices connected to the output device can be determined, so that before the first mode is switched to the second mode, the second interface group of the second processing device connected to the output device can be determined.

Similar to the embodiments described above, if the processing device is connected to the output device through the integrated interface at the output device that supports the transmission of the media data and the interaction data, the interface group to which the processing device is connected can be directly determined, and there is no need to obtain the device identification of the processing device based on the integrated interface.

In some other embodiments, even if the processing device connected to the integrated interface can be determined, the interface group corresponding to each processing device can be determined through the device identifications connected to different interfaces.

An output method consistent with the present disclosure will be described below in combination with an implementation manner of determining the interface group of the processing device based on the device identification of the processing device connected to the interface.

FIG. 7 shows another schematic flowchart of an output method consistent with the present disclosure, which can be applied to the output device. The method includes the following processes.

S701, determining the multiple target interfaces of the output device that are connected to the processing devices.

For ease of distinction, the interfaces of the output device that are connected to the processing devices are referred to as the target interfaces.

When the output device is connected to two processing devices, there are two or more target interfaces of the output device that are connected to the processing devices.

S702, determining the first interface group of the output device that is connected to the first processing device and the second interface group of the output device that is connected to the second processing device based on the device identifications of the processing devices connected to the target interfaces.

The first interface group includes at least one target interface, and the second interface group includes at least one target interface.

The device identification of the processing device may be configured to uniquely identify the processing device. The device identification of the processing device may be a device code, IP address, or another identification information of the processing device.

There are several possibilities for determining the device identification of the processing device connected to the target interface.

For example, in a possible implementation manner, after detecting to be connected to the output device, the processing device feeds back the device identification of the processing device to the output device through the connected target interface. Correspondingly, based on the device identifications corresponding to each target interface, the output device may determine at least one target interface corresponding to the same device identification as one interface group, so as to respectively connect to the first interface group and the second interface group of the two processing devices.

In another possible implementation manner, after detecting to be connected to the output device through the target interface, the processing device may obtain identification data of the output device through the target interface. On this basis, if the processing device is connected to the output device through two target interfaces, the identification data of the output device can be obtained through the two target interfaces. If the identification data of the output device obtained by the two target interfaces indicates that the two target interfaces are connected to the same output device, the processing device may send interface combination information to the output device.

The interface combination information may include a correspondence relationship between the two target interfaces and the identification information of the processing device, so that the output device can determine that the two target interfaces are connected to the processing device as the interface group.

For example, if the processing device is connected to one USB interface and one HDMI interface of the output device, the processing device can obtain a device identification of a USB hub at the output device through the USB interface, and obtain display identification information (such as extended display identification data (EDID)) of the output device through the HDMI interface. If the device identification of the hub and the EDID indicate that the USB interface and the HDMI interface are connected to the same output device, the processing device can determine that the two interfaces are the corresponding interface group of the processing device, and can notify information of the interface group to the output device.

In some other embodiments, if the processing device is connected to the output device through only one target interface, the processing device may not send the interface combination information. It may also be that the interface combination information includes the correspondence relationship between the target interface and the identification of the processing device.

The above processes S701 and S702 may be performed at any moment after the output device is connected to the processing device, or may be performed after the output device detects the mode switch instruction. For example, after the mode switch instruction is detected, since the output device cannot determine the interface groups corresponding to the two processing devices or whether it is currently in the first mode, it is needed to first determine the interface groups of the two processing devices.

In addition, the above processes are described by using an example in which the interface groups for the first processing device and the second processing device are simultaneously determined through S701 and S702. In practical applications, if the first processing device or the second processing device is connected to the output device through one integrated interface, the output device can directly determine the interface group of the first processing device or the second processing device, so that the interface group of the first processing device or the second processing device that is not connected to the output device through the integrated interface can be determined based on the above two processes.

S703, when the output device is in the first mode, obtaining the first media data from the first processing device, outputting the first media data to the output apparatus of the output device, and controlling the transmission of the interaction data between the first processing device and the interaction device connected to the output device.

In some embodiments, the output device may determine the mode it is in before receiving the mode switch instruction, and perform process S703 in the first mode.

In practical applications, the output device may also determine the mode it is in after detecting the mode switch instruction, and then perform process S703 if it is in the first mode, so as to realize switching from the first mode to the second mode.

S704, detecting the mode switch instruction, and switching from the first mode to the second mode if the second interface group supports the transmission of the media data and the interaction data.

S705, when the output device is in the second mode, obtaining the second media data from the second processing device, outputting the second media data to the output apparatus, and controlling the transmission of the interaction data between the second processing device and the interaction device.

As for processes S703 and S704, reference may be made to the relevant description in the above embodiments, which will not be repeated herein.

In the method consistent with the present disclosure, when it is switched from the first mode to the second mode, there is no need for the user to determine or configure the interface group corresponding to the processing device connected to the output device, which further reduces complexity of the mode switch.

In any of the above embodiments, after the mode switch instruction is obtained, if the output device is in the first mode, and the second interface group only supports the transmission of the media data or the interaction data, it indicates that the media data and the processing device connected to the interaction device cannot be switched synchronously at the same time. Therefore, the output device can be kept in the first mode.

Figure 8:
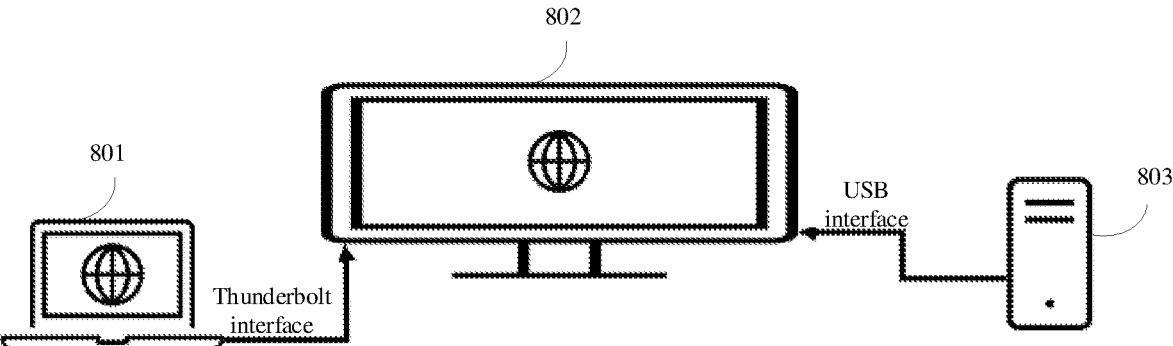
FIGS. 8-10 show schematic diagrams of three scenarios in which switching from a first mode to a second mode is not supported according to an embodiment of the present disclosure.
Figure 9:
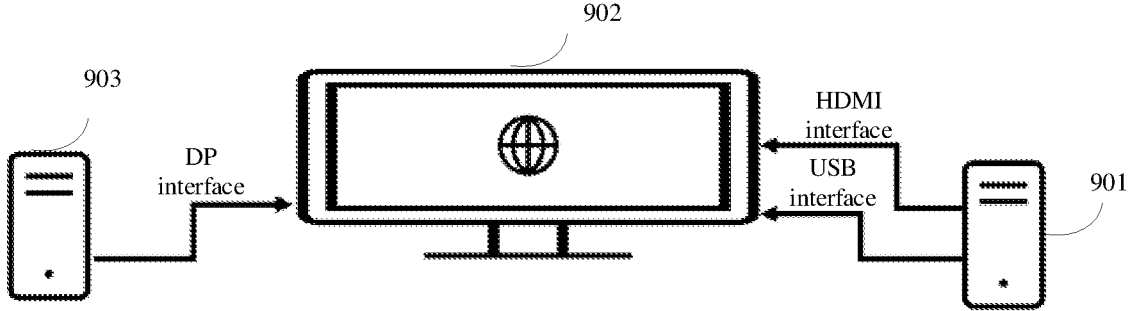

For example, in FIG. 8, a first processing device 801 is connected to an output device 802 through the thunderbolt interface, while a second processing device 803 is only connected to the USB interface of the output device. In FIG. 9, a first processing device 901 is connected to the output device 902 through the USB interface and the HDMI interface, while a second processing device 903 is only connected to the output device 902 through the DP interface. In these two cases, the output device does not support switching from the first mode to the second mode.

An example of FIG. 8 is used for illustration. If the current output device obtains the first media data of the first processing device through the thunderbolt interface and outputs to the output device, and controls the thunderbolt interface to be connected to the interaction interface, after the mode switch instruction is detected, there is no interface supporting the media data transmission between the second processing device and the output device. Therefore, the media data source cannot be switched from the first processing device to the second processing device. In this case, it is not suitable to switch the media data source and the output device connected to the interaction interface synchronously, so the first mode can be kept unchanged without responding to the mode switch instruction.

In some embodiments, in the case that the second interface group only supports the transmission of the media data or the interaction data, the switch option in the setup menu image such as the OSD menu can be controlled to be in a non-selectable state. In this case, the user cannot trigger to generate the mode switch instruction by selecting the switch option.

One integrated interface (such as the thunderbolt interface or the USB-C interface) at the output device that supports the transmission of the media data and the interaction data is configured to achieve synchronous transmission of the media data and the interaction data. However, if the integrated interface at the output device is connected to a conversion interface for converting data transmission type of the interface, and is finally connected to the processing device through the conversion interface, it indicates that the user only wants to realize transmission of type of data corresponding to the conversion interface through the integrated interface.

Therefore, if the second interface group connected to the second processing device is the integrated interface that supports the transmission of the media data and the interaction data, and the integrated interface is connected to the conversion interface for converting the data transmission type of the interface, the output device does not support switching from the first mode to the second mode.

Correspondingly, in any one of the above embodiments of the present disclosure, the transmission of the media data and the interaction data in the second interface group may indicate that the second interface group includes the media interface that supports the media data transmission and the interaction interface that supports the interaction data transmission, or that the second interface group is the integrated interface that supports the transmission of the media data and the interaction data, and the integrated interface is not connected to the conversion interface for converting the data transmission type of the interface.

For example, the integrated interface is the USB-C interface, but data transmission supported by the integrated interface changes after the integrated interface is connected to an adapter for converting to USB-A.

Figure 10:
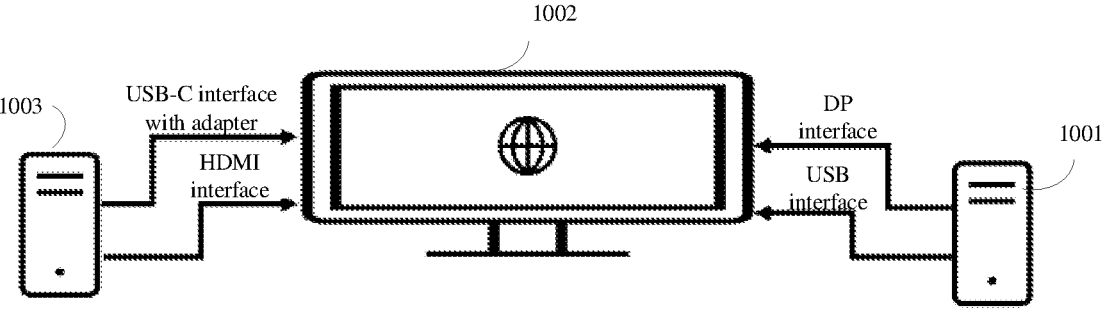

Referring to FIG. 10, a first processing device 1001 is connected to an output device 1002 through one DP interface and one USB interface, and a second processing device 1003 is connected to the USB-C interface at the output device 1002 through the adapter for converting to USB-A, and is also connected to the HDMI interface at the output device. On this basis, if the output device is in the first mode, since the second processing device is connected to the USB-C interface at the output device through a USB-A adapter, the output device does not support switching from the first mode to the second mode.

In addition to the integrated interface, the output device may also have multiple media interfaces and USB interfaces that support the media data transmission. On this basis, the output device may also be connected to three or more processing devices.

Figure 11:
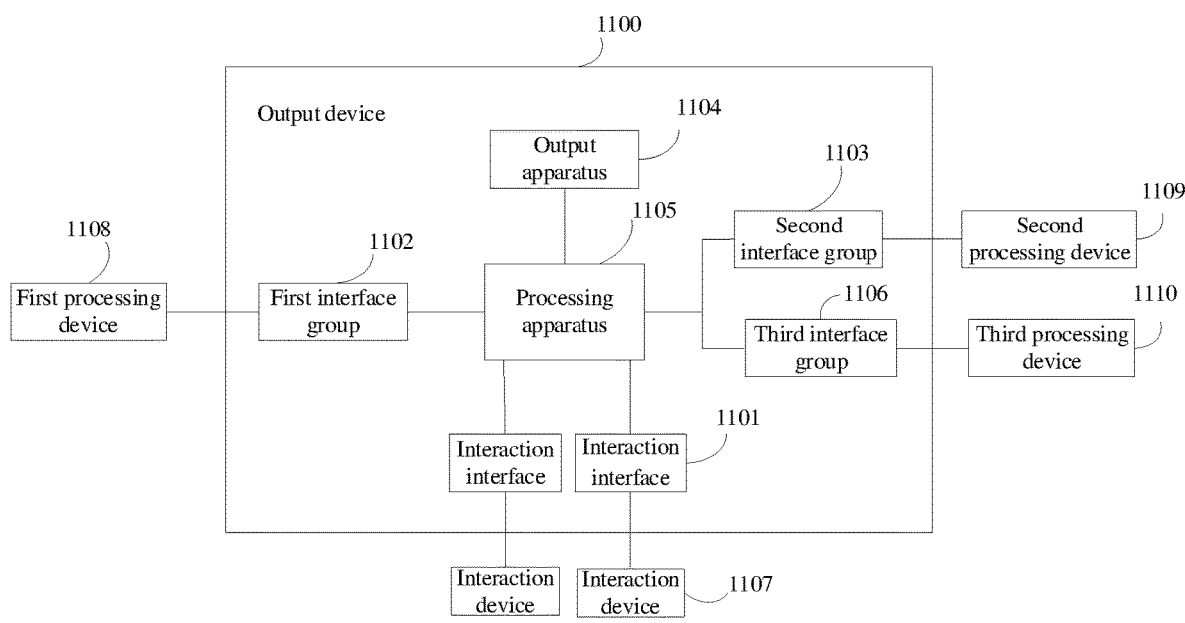
FIG. 11 shows another schematic structural diagram of an output device according to an embodiment of the present disclosure.

FIG. 11 shows another schematic structural diagram of an output device according to an embodiment of the present disclosure.

As shown in FIG. 11, an output device 1100 includes at least one interaction interface 1101, a first interface group 1102, a second interface group 1103, an output apparatus 1104, a processing apparatus 1105, and a third interface group 1106.

The interaction interface 1101 is configured to connect to an interaction device 1107, such as the flash drive or the portable hard disk in FIG. 11.

The first interface group 1102 is configured to connect to a first processing device 1108, and the second interface group 1103 is configured to connect to a second processing device 1109.

As for the interaction interface, the first interface group, and the second interface group, reference may be made to the relevant description in the above embodiments, which will not be repeated herein.

In some embodiments, the third interface group 1106 is configured to be connected to a third processing device 1110, and the third interface group is a third media interface for transmitting the media data.

The third processing device may be a same type as or different type from the first processing device and the second processing device, which is not limited herein. For example, the third processing device may be the mobile phone, the notebook computer, the host device, etc.

In some embodiments, the processing apparatus 1105 is also configured to control the output device to switch from the first mode to a third mode, or control the output device to switch from the third mode to the first mode.

When the output device is in the third mode, the output apparatus of the output device can output the media data from the third processing device, and the interaction data can be transmitted between the first processing device or the second processing device and the interaction device.

For example, when the output device is in the third mode, the processing apparatus can control the third interface group (i.e., the third media interface) to be connected to the output apparatus. On this basis, the output device can obtain the media data from the second processing device and output to the output apparatus. Meanwhile, the output device can control the first interface group or the second interface group to be connected to the interaction interface, so as to control the transmission of the interaction data between the first processing device or the second processing device and the interaction device.

Figure 12:
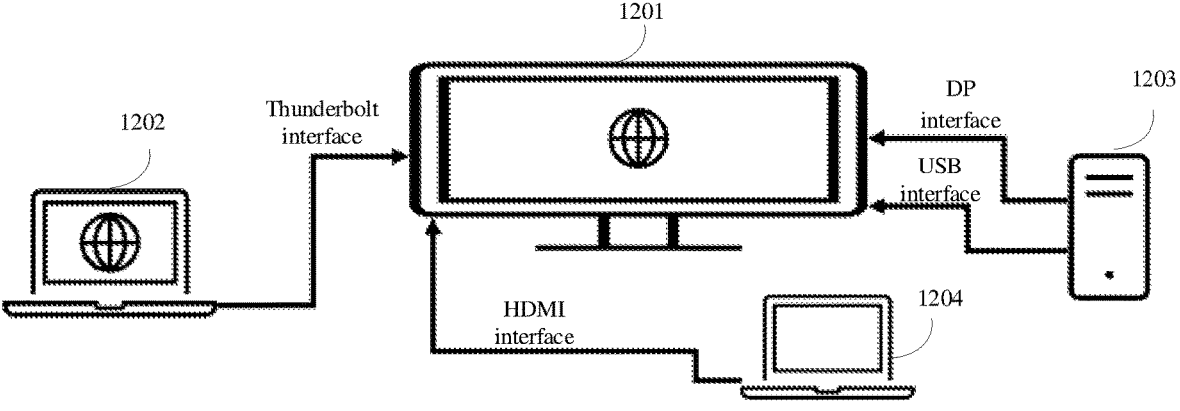
FIG. 12 shows a schematic structural diagram of an output device connected to three processing devices according to an embodiment of the present disclosure.

For ease of understanding, an example in which the first interface group is the thunderbolt interface and the second interface group is the DP interface is used for illustration. FIG. 12 shows a schematic structural diagram of an output device connected to three processing devices according to an embodiment of the present disclosure.

In FIG. 12, an output device 1201 is connected to a first processing device 1202 through the thunderbolt interface.

One USB interface of the output device and one DP interface supporting the media data transmission are connected to a second processing device 1203.

Meanwhile, one HDMI interface of the output device that supports the media data transmission is connected to a third processing device 1204.

In FIG. 12, an example in which the first processing device and the third processing device are notebook computers, and the second processing device is the host computer is used for illustration.

In addition, it is assumed that the output device is connected to the input device, such as the keyboard, the mouse, etc., through the interaction interface (not shown in FIG. 12).

When the output device is in the first mode, the output device controls the thunderbolt interface to be connected to the output apparatus and the interaction interface, obtains the first media data from the first processing device through the thunderbolt interface and outputs to the output apparatus, and realizes data transmission between the first processing device and the input device such as the keyboard or the mouse at the interaction interface.

If the first mode is switched to the third mode, the output device may switch a connection between the thunderbolt interface and the output apparatus to a connection between the HDMI interface and the output apparatus. On this basis, the output device may obtain third media data from the third processing device through the HDMI interface and output to the output apparatus. Meanwhile, the output device can keep a connection between the thunderbolt interface and the interaction interface, so that the input device such as the mouse can be connected to the first processing device. The output device may also switch the connection between the thunderbolt interface and the interaction interface to a connection between the USB interface of the second processing device and the interaction interface.

Similarly, when the output device is in the third mode, if the user wants to switch the media data and the processing device connected to the input device to the same processing device, the third mode can also be switched to the first mode.

For example, the output device is in the third mode, the HDMI interface connected to the third processing device is connected to the output apparatus, and the USB interface connected to the second processing device is connected to the interaction interface. On this basis, if it is needed to switch from the third mode to the first mode, a connection between the HDMI interface and the output device can be switched to a connection between the thunderbolt interface and the output device, and a connection between the USB interface and the interaction interface can be switched to the connection between the thunderbolt interface and the inter- action interface, so that the USB interface supporting the USB data transmission and the HDMI interface supporting the media data transmission can be switched to the thun- derbolt interface synchronously.

FIG. 12 only shows an example, and the present disclo- sure is also applicable to another case, such as that the third media interface connected to the third processing device is replaced by the DP interface, the USB interface and the DP interface connected to the second processing device are replaced by the USB-C interface, etc.

In a structure shown in the embodiments of FIG. 11, when the output device is in the first mode, if the mode switch instruction is detected and the second interface group sup- ports the transmission of the media data and the interaction data at the same time, the first mode may also be switched to the second mode by default.

In consideration of different switch needs of the users, in the present disclosure, a second menu image may also be output before the first mode is switched to the third mode. For example, when the user needs to switch modes, the output device may be triggered to display the second menu image through a specific operation. As another example, after the mode switch instruction is detected, since the output device cannot determine whether to switch to the second mode or the third mode, the second menu image is displayed.

The second menu image can affect display of the first media data output by the first processing device, the second media data output by the second processing device, and the third media data output by the third processing device. The second menu image is generated by the processing apparatus of the output device instead of the processing device. For example, the second menu image can be the OSD menu.

As for influence of the second menu image on the first media data, the second media data, and the third media data, reference may be made to influence manners of the first menu image on the various media data described above, which will not be repeated herein.

The second menu image may include an interface group selection area, and the interface group selection area includes a plurality of candidate interfaces for selection. The plurality of the candidate interfaces include the third media interface, the interfaces supporting the interaction data transmission in the first interface group, and the interfaces supporting the interaction data transmission in the second interface group.

For example, if the first interface group and the second interface group are the interfaces that support the transmission of the media data and the interaction data at the same time, the candidate interfaces may include the third media interface, the first integrated interface corresponding to the first interface group, and the second integrated interface corresponding to the second interface group. If the first interface group includes the first media interface and the first data interface, the interface supporting the interaction data transmission in the first interface group is the first data interface; similarly, if the second interface group includes the second media interface and the second data interface, the interface supporting the interaction data transmission in the second interface group is the second data interface.

On this basis, based on a target interface group selected by the user from the multiple candidate interfaces, the first mode is switched to the second mode or the third mode corresponding to the target interface group. The target interface group includes at least one candidate interface in a candidate interface group.

If the target interface group is the second interface group, the first mode is switched to the second mode. If the target interface group includes the third media interface and the interface supporting the interaction data in the first interface group or the second interface group, the first mode is switched to the third mode.

In addition to determining the second mode or the third mode to be switched by selecting the target interface group in the second menu image, in practical applications, it is also possible to provide different mode switch buttons or output different mode switch options to trigger different mode switch instructions. For example, the mode switch instruction may be a first mode switch instruction, which is configured to request switch from the first mode to the second mode. As another example, the mode switch instruction may also be a second mode switch instruction, which is configured to request switching from the first mode to the third mode.

In a structure of FIG. 11, in order to determine the mode of the output device and which interfaces are connected to one processing device, the output device also needs to determine the interface group to which each processing device is connected before the first mode is switched to the second mode and the second mode is switched to the third mode.

An implementation manner of determining the interface groups of the connected processing devices by the output device may be any one of the above-mentioned manners, which is not limited herein.

For ease of understanding, an output method consistent with the present disclosure will be described below in combination with a possible implementation manner of determining the interface group, and two possible situations in which the first mode is switched to the second mode and the third mode is switched to the first mode.

Figure 13:
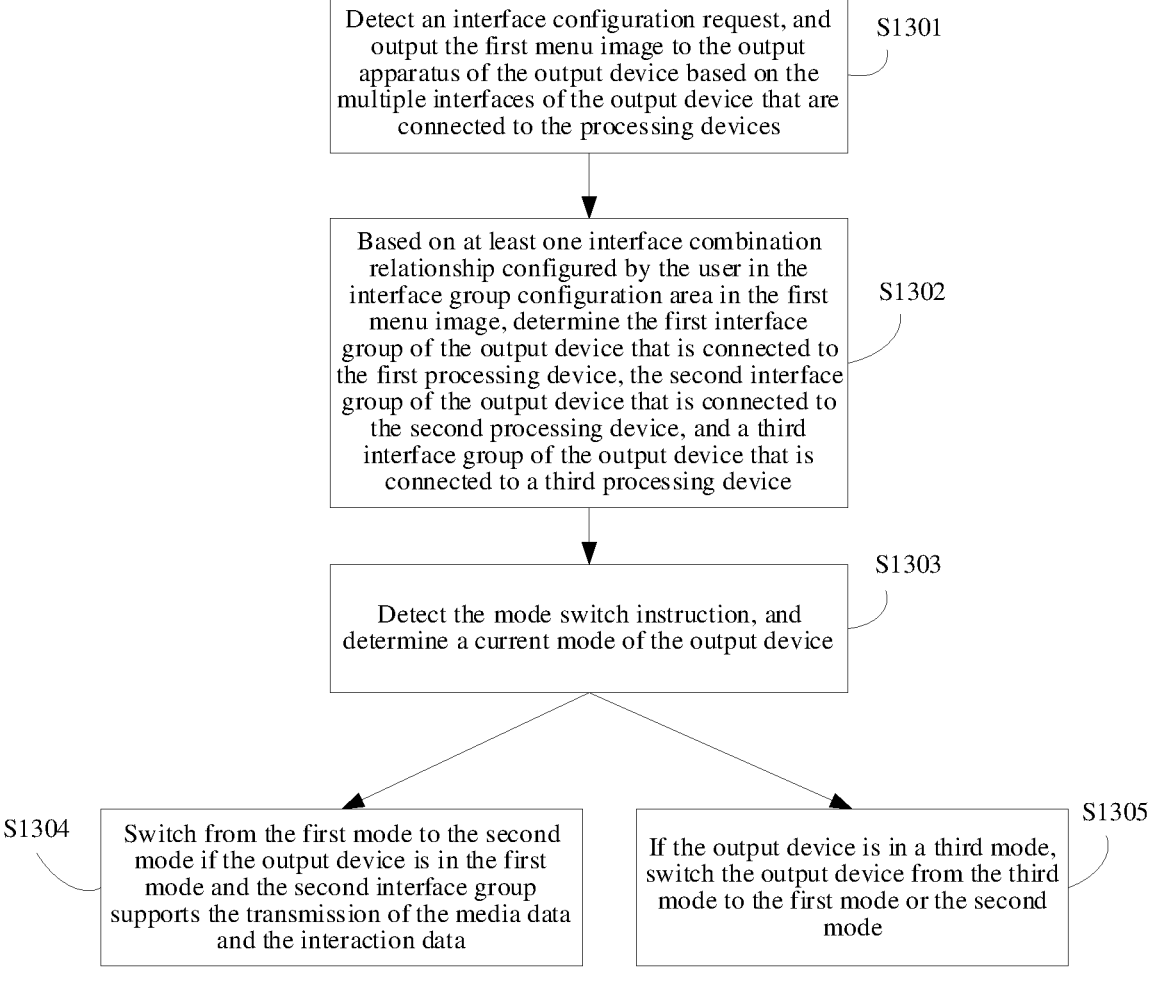
FIG. 13 shows another schematic flowchart of an output method according to an embodiment of the present disclosure.

FIG. 13 shows another schematic flowchart of an output method consistent with the present disclosure. The method includes the following processes.

S1301, detecting the interface configuration request, and outputting the first menu image to the output apparatus of the output device based on the multiple interfaces of the output device that are connected to the processing devices.

The first menu image includes the interface group configuration area.

For example, the interface configuration request may be an operation input by the user to open the first menu image. If the first menu image is the OSD menu, the user opens the OSD menu through the operation, and determines that the interface configuration request is detected.

S1302, based on at least one interface combination relationship configured by the user in the interface group configuration area in the first menu image, determining the first interface group of the output device that is connected to the first processing device, the second interface group of the output device that is connected to the second processing device, and the third interface group of the output device that is connected to the third processing device.

The interface combination relationship in the interface group configuration area may be as described above, which will not be repeated herein.

For ease of understanding, referring to FIG. 12, an example in which the interface group configuration area of the first menu image is configured with at least one candidate interface combination relationship corresponding to multiple interfaces of the output device that are connected to the processing devices, and each candidate interface combination relationship may include two combined interfaces is used for illustration.

On the basis of FIG. 12, since the thunderbolt interface supports the transmission of the media data and the interaction data at the same time, the thunderbolt interface cannot be combined with another interface to connect to one processing device. Therefore, in a scenario of FIG. 12, it cannot be determined whether the USB interface and the HDMI interface are connected to one processing device, whether the USB interface and the DP interface are connected to one processing device, or whether the USB interface, the DP interface, and the HDMI interface are respectively connected to one processing device. Therefore, possible combination relationships among the USB interface, the HDMI interface, and the DP interface can be output in the interface group configuration area in the first menu image, as shown in a first menu image displayed in FIG. 14.

Figure 14:
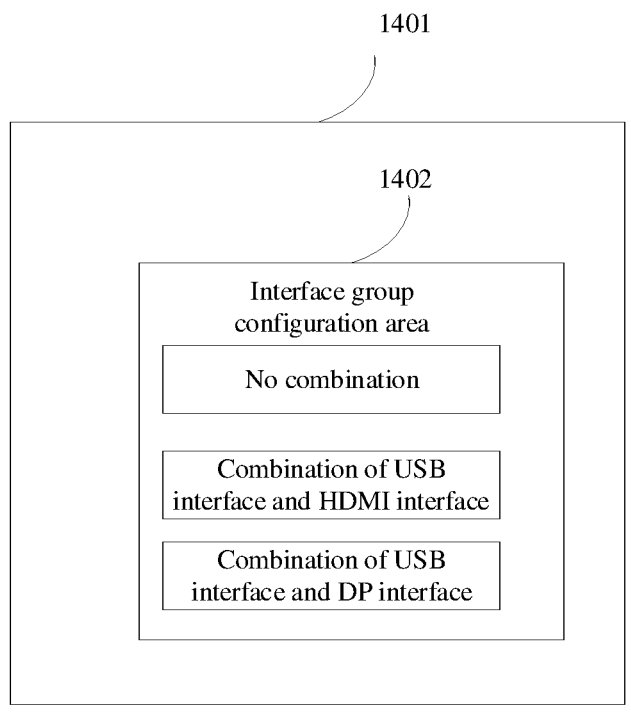
FIG. 14 shows a schematic diagram of a first menu image according to an embodiment of the present disclosure.

Three candidate interface combination relationships are displayed in an interface group configuration area 1402 of a first menu image 1401 in FIG. 14, which are no combination, combination of the USB interface and the HDMI interface, and combination of the USB interface and the DP interface.

No combination refers to that the USB interface, the HDMI interface, and the DP interface are respectively connected to different processing devices. If there is no combination of the three interfaces, it indicates that except for the first processing device connected to the interface that supports the transmission of the media data and the interaction data in the first interface group, the interface groups connected to the second processing device and the third processing device do not meet conditions for simultaneous transmission of the media data and the interaction data, so that switching from the first mode to the second mode is not supported.

Referring to FIG. 12, the USB interface is actually connected to the second processing device together with the HDMI interface. Therefore, the user can select "combination of the USB interface and the DP interface" in the interface group configuration area 1402, so that the output device can determine that the thunderbolt interface is connected to one processing device, the combination of the USB interface and the DP interface is connected to one processing device, and the HDMI interface is connected to another processing device.

The above processes S1301 and S1302 are illustrated by using an example in which the user configures the interface combination relationship by initiating the interface configuration request before the mode switch instruction is detected. In practical applications, the above processes S1301 and S1302 may also be performed after the mode switch instruction is detected.

In addition, in some embodiments, an example in which the interface group of each processing device is determined based on the first menu image is used for illustration. A situation in which the output device obtains the device identification of the processing device through each interface connected to the processing device, obtains the identification of the processing device in combination with each interface, and determines the interface group connected to each processing device is also applicable to the present disclosure, which will not be repeated herein.

S1303, detecting the mode switch instruction, and determining the current mode of the output device.

The mode of the output device may be determined according to the processing devices respectively connected to the interaction device and the output apparatus of the output device.

S1304, switching from the first mode to the second mode if the output device is in the first mode and the second interface group supports the transmission of the media data and the interaction data.

In consideration of a premise that the first interface group and the second interface group connected to the output device both support the transmission of the media data and the interaction data, user's demand for synchronously switching the media data and the processing devices connected to the interaction interface is higher. Therefore, in the present disclosure, the first mode can be directly switched to the second mode after the mode switch instruction is detected, so that when the media data source is switched from the first processing device to the second processing device, the interaction interface connected to the interaction device is also switched to be connected to the second processing device.

The process S1304 only illustrates one situation. In practical applications, after the mode switch instruction is detected, the second menu image can also be displayed as described above, and the first mode can be switched to the second mode or the third mode corresponding to the target interface group based on the target interface group configured by the user in the second menu image. It can also be determined whether the mode switch instruction is the first mode switch instruction or the second mode switch instruction. If it is the first mode switch instruction, the first mode is switched to the second mode; otherwise, the first mode is switched to the third mode.

S1305, if the output device is in the third mode, switching the output device from the third mode to the first mode or the second mode.

In the third mode, in order to make the media data source and the processing device connected to the interaction device are the same one, the third mode can be switched to the first mode or the second mode in the present disclosure.

For example, in a possible situation, when the output device is in the third mode, the second menu image can also be output. Based on the target interface group configured by the user in the second menu image, if the target interface group is the first interface group, the third mode is switched to the first mode; if the target interface group is the second interface group, the third mode is switched to the second mode.

In another possible situation, priorities of the first mode and the second mode may also be set, and the third mode may be switched to the first mode or the second mode with higher priority.

For example, the first mode is set as high priority. In this case, if the first interface group supports the transmission of the media data and the interaction data, the third mode is switched to the first mode; if the first interface group only supports the transmission of the media data or the interaction data, and the second interface group supports the transmission of the media data and the interaction data, the third mode is switched to the second mode.

As another example, the interface group that belongs to the integrated interface (such as the thunderbolt interface or the USB-C interface) is set as high priority. If the first interface group is the first integrated interface, the third mode is switched to the first mode; if the second interface group is the second integrated interface, the third mode is switched to the second mode.

In a situation that the output device is connected to the first processing device and the second processing device, or the output device is connected to the first processing device, the second processing device, and the third processing device, the output device may also have a fourth mode.

When the output device is in the fourth mode, the output apparatus of the output device can output the media data from the second processing device, and the interaction data can be transmitted between the first processing device and the interaction device. That is, in the fourth mode, the media data source of the output device and the processing device connected to the interaction device are not the same processing device.

For example, as shown in FIG. 2, if the output device controls the HDMI interface to be connected to the output apparatus of the output device, the output device can obtain the media data from the second processing device through the HDMI interface. Meanwhile, the output device controls the thunderbolt interface of the first processing device to be connected to the interaction interface, so that the interaction data is transmitted between the first processing device and the interaction device.

When the output device is in the fourth mode, the output device may support switch from the fourth mode to the first mode.

In some embodiments, after the mode switch instruction is obtained, if the output device is in the fourth mode, but the first interface group or the second interface group only supports the transmission of the media data or the interaction data, the output device can be kept in the fourth mode.

The present disclosure also provides a computer-readable storage medium, and at least one instruction, at least one program, a code set, or an instruction set is stored in the computer-readable storage medium. The at least one instruction, at least one program, the code set, or the instruction set is loaded and executed by a processor to implement the output method consistent with the present disclosure described in any one of the above embodiments.

The present disclosure also provides a computer program. The computer program includes computer instructions, which are stored in the computer-readable storage medium. The computer program, when running on the electronic device, is configured to execute the output method consistent with the present disclosure described in any one of the above embodiments.

The various embodiments in this specification are described in a progressive manner. Each embodiment focuses on the differences from other embodiments, and for the same or similar parts between the various embodiments, reference can be made to each other. At the same time, features recorded in the various embodiments in this specification can be replaced or combined with each other, so that those skilled in the art can realize or use the present disclosure. For the apparatuses disclosed in the embodiments, since they are basically similar to the methods disclosed in the embodiments, the descriptions are relatively simple, and for relevant information, reference can be made to the descriptions of the methods.

Relational terms such as first and second are only used herein to distinguish one entity or operation from another entity or operation, and do not necessarily require or imply any such actual relationship or order between these entities or operations. The terms "include," "involve" or any other variations thereof are intended to cover non-exclusive inclusion, so that a process, method, object, or device including a series of elements not only includes those elements, but also includes other elements that are not explicitly listed, or also includes elements inherent to such processes, method, object, or device. Without further restrictions, the element associated with phrase "including a . . . " does not exclude the existence of other identical elements in the process, method, object, or device that includes the element.

The foregoing description of the disclosed embodiments enables those skilled in the art to implement or use the present disclosure. Various modifications to these embodiments will be obvious to those skilled in the art, and the general principles defined herein can be implemented in other embodiments without departing from the spirit or scope of the present disclosure. Therefore, the present disclosure is not limited to the embodiments shown herein, but should conform to the widest scope consistent with the principles and novel features disclosed herein.

The above are some embodiments of the present disclosure. For those skilled in the art, various improvements and modifications can be made without departing from the principle of the present disclosure. These improvements and modifications are also considered to be within the scope of the present disclosure.

What is claimed is:

1. An output device comprising:
an interaction interface configured to be connected to an interaction device;
a first interface group configured to be connected to a first processing device;
a second interface group configured to be connected to a second processing device, the second interface group including a data interface supporting interaction data transmission and a media interface supporting media data transmission, the second interface group being identified based on correlating device identification information of the second processing device with a universal serial bus (USB) hub identification associated with the data interface and extended display identification data (EDID) associated with the media interface, data identifying the second interface group including data indicative of the correlation of the device identification information of the second processing device with the USB hub identification and the EDID being received from the second processing device;

an output apparatus; and
a processing apparatus configured to:
switch the output device between:
a first mode, in which the output apparatus outputs media data from the first processing device, and interaction data is transmitted between the first processing device and the interaction device; and
a second mode, in which the output apparatus outputs media data from the second processing device, and the interaction data is transmitted between the second processing device and the interaction device; and
in response to the output device being in the second mode, control the media interface to be connected to the output apparatus, and control the data interface to be connected to the interaction interface, wherein in response to a switch into the second mode, the connection of the media interface to the output apparatus and the connection of the data interface to the interaction interface are automatically established based on the correlation of the device identification information of the second processing device with the USB hub identification and the EDID.

2. The output device of claim 1, wherein:
the first interface group includes:
a first data interface supporting interaction data transmission and a first media interface supporting media data transmission, or
a first integrated interface supporting both interaction data transmission and media data transmission; and
the processing apparatus is configured to:
in response to the output device being in the first mode, control the first media interface or the first integrated interface to be connected to the output apparatus, and control the first data interface or the first integrated data interface to be connected to the interaction interface.

3. The output device of claim 1, further comprising:
a media interface configured to be connected to a third processing device;
wherein the processing apparatus is further configured to control the output device to switch between:
the first mode, and
a third mode, in which the output apparatus outputs media data from the third processing device, and the interaction data is transmitted between the first processing device or the second processing device and the interaction device.

4. The output device of claim 1, wherein the processing apparatus is further configured to control the output device to switch between:
the first mode, and
a third mode, in which the output apparatus outputs the media data from the second processing device, and the interaction data is transmitted between the first processing device and the interaction device.

5. An output method comprising:
while an output device is in a first mode, obtaining first media data from a first processing device, outputting the first media data to an output apparatus of the output device, and controlling transmission of interaction data between the first processing device and an interaction device connected to the output device;
determining an interface group, of the output device, that is connected to a second processing device, the interface group including a data interface supporting interaction data transmission and a media interface supporting media data transmission, the interface group being determined based on correlating device identification information of the second processing device with a universal serial bus (USB) hub identification associated with the data interface and extended display identification data (EDID) associated with the media interface, data identifying the interface group including data indicative of the correlation of the device identification information of the second processing device with the USB hub identification and the EDID being received from the second processing device;

switching the output device from the first mode to a second mode;

in response to the switching of the output device from the first mode to the second mode, automatically establishing a connection of the media interface to the output apparatus and a connection of the data interface to the interaction device based on the correlation of the device identification information of the second processing device with the USB hub identification and the EDID; and while the output device is in the second mode, obtaining second media data from the second processing device, outputting the second media data to the output apparatus, and controlling transmission of the interaction data between the second processing device and the interaction device.

6. The method of claim 5, wherein switching the output device from the first mode to the second mode includes switching the output device from the first mode to the second mode in response to the interface group supporting both media data transmission and interaction data transmission.

7. The method of claim 6, wherein determining the interface group connected to the second processing device further includes:

outputting a menu image to the output apparatus of the output device based on a plurality of interfaces, of the output device, that are connected to processing devices, and determining the interface group connected to the second processing device based on at least one interface combination relationship configured by a user in an interface group configuration area of the menu image, the interface group configuration area being configured to configure combination relationships among the plurality of the interfaces, and the menu image affecting display of the first media data and the second media data.

8. The method of claim 6, further comprising:

obtaining a mode switch instruction; and in response to the output device being in the first mode and the interface group supporting only media data transmission or only interaction data transmission, keeping the output device in the first mode.

9. The method of claim 6, wherein the first processing device is connected to the output device through a first interface group of the output device and the interface group connected to the second processing device is a second interface group;

the method further comprising:

obtaining the mode switch instruction; and in response to the output device being in a third mode and the first interface group or the second interface group supporting only media data transmission or only interaction data transmission, keeping the output device in the third mode, wherein when the output device is in the third mode, the output apparatus outputs the second media data from the second processing device, and the interaction data is transmitted between the first processing device and the interaction device.

10. The method of claim 5, further comprising:

switching the output device from the first mode to a third mode; and while the output device is in the third mode, obtaining media data from a third processing device and outputting to the output apparatus, and controlling transmission of the interaction data between the first processing device or the second processing device and the interaction device, the output device being connected to the third processing device through an interface group including a media interface for media data transmission.

* * * * *